United States Patent [19]
Rogers

[11] B 3,923,781

[45] Dec. 2, 1975

[54] GALACTOGLUCOMANNAN BORIC ACID COMPLEX

[75] Inventor: John K. Rogers, Toledo, Ohio

[73] Assignee: Owens-Illinois, Inc., Toledo, Ohio

[22] Filed: May 22, 1972

[21] Appl. No.: 255,756

[44] Published under the Trial Voluntary Protest Program on January 28, 1975 as document no. B 255,756.

[52] U.S. Cl............ 260/209 R; 162/178; 260/234 R
[51] Int. Cl.²..................... C07H 23/00; C08B 37/00
[58] Field of Search ................................ 260/209 R

[56] References Cited
UNITED STATES PATENTS

| | | | |
|---|---|---|---|
| 2,453,108 | 11/1948 | Curtis............................. | 260/209 R |
| 3,231,561 | 1/1966 | Brunelle et al.................. | 260/209 R |

OTHER PUBLICATIONS

Walker, "Chem. Abst." Vol. 64, 1966, p. 3,820 (e).
Black et al., "Chem. Abst." Vol. 64, 1966, p. 7,941 (b).

*Primary Examiner*—Johnnie R. Brown
*Attorney, Agent, or Firm*—Howard G. Bruss, Jr.; E. J. Holler

[57] ABSTRACT

A method of increasing the stability to alkali of galactoglucomannan is disclosed which comprises refluxing this major hemicellulose present in softwoods with aqueous solutions containing boron to form galactoglucomannan-boron complexes. Galactoglucomannan per se is useful as a strength improving additive for paper.

1 Claim, No Drawings

GALACTOGLUCOMANNAN BORIC ACID COMPLEX

BACKGROUND OF THE INVENTION

The "peeling reaction" is one of the major methods by which the cellulosic components of wood are degraded by alkali. The degradation proceeds through the reducing end group of the polysaccharide via a rearrangement whereby the terminal units are cleaved. If this alkaline peeling is not stopped by branching in the polysaccharide chain, approximately 50 anhydrosugar units are removed before an alkali-stable unit is formed at the reducing end. Numerous reagents have been used in the past to stabilize polysaccharides by oxidation or reduction of the terminal reducing group. These reagents include hydrogen sulfide, polysulfide and sodium borohydride.

Boric acid is known to complex with certain carbohydrates and a comprehensive review of such complexes appears in U.S. Pat. No. 2,453,108 which is hereby incorporated by reference. Since galactoglucomannan is a polymer containing approximately one part each of galactose and glucose for every three parts of mannose, it was deemed worthwhile to attempt to complex said polymer with boric acid or a metal borate to increase its alkaline stability in the hope that the complex formation would occur at several places along the polymer and not merely at the reducing end. Such a technique can stop the "peeling reaction" and increase the yield in alkaline pulping of softwoods.

SUMMARY OF THE INVENTION

It has been discovered that galactoglucomannan polymer can be stabilized to alkali by complexing it with a boron compound such as boric acid or an alkali metal borate. The polymer is refluxed in an alkali medium with from 1 to 10 percent by weight of an aqueous solution of the boron compound for up to 2 hours. The solution is then quenched and tested as to alkali consumption and residual galactoglucomannan.

PREFERRED EMBODIMENTS

EXAMPLE 1

Samples of galactoglucomannan (GGM) were treated with an aqueous solution containing 20 percent (based on oven dried GGM) by weight of sodium hydroxide and refluxed for various periods of time up to 2 hours. The control sample contained no boric acid whereas other samples contained from 1 to 10 percent by weight of boric acid. After the desired reflux time, the samples were quenched and alkali consumption and residual GGM were determined. The results are shown in the table below wherein all samples had a volume of about 90 milliliters.

| % by Weight Boric Acid | Reflux Time In Minutes | % GGM Remaining | % NaOH Remaining |
|---|---|---|---|
| 0 | 0 | 62 | 51 |
| 1 | 0 | 64 | 58 |
| 10 | 0 | 80 | 49 |
| 0 | 15 | 50 | 29 |
| 1 | 15 | 55 | 32 |
| 10 | 15 | 76 | 39 |
| 0 | 30 | 43 | 24 |
| 1 | 30 | 49 | 24 |
| 10 | 30 | 63 | 29 |
| 0 | 60 | 40 | 18 |
| 1 | 60 | 47 | 18 |
| 10 | 60 | 56 | 27 |
| 0 | 90 | 39 | 12 |
| 1 | 90 | 46 | 12 |
| 10 | 90 | 53 | 18 |
| 0 | 120 | 37 | 10 |
| 1 | 120 | 43 | 10 |
| 10 | 120 | 50 | 18 |

From the foregoing data, it is apparent that at all reflux times, the residual galactoglucomannan increased when boric acid was present which would be expected if stabilization were occurring. At any given reflux time greater than zero, the boric acid-treated samples had sodium hydroxide residuals equal to or greater than the untreated samples. This also supports the stabilization theory since increased stabilization will result in less alkali consumption.

EXAMPLE 2

In another series of tests, the boric acid stabilization of galactoglucomannan (GGM) refluxed with 20 percent by weight aqueous NaOH and 5 percent by weight $Na_2S$ was investigated with the results shown in the following table wherein all samples had a volume of about 110 milliliters.

| % by Weight Boric Acid | Reflux Time In Minutes | % GGM Remaining | % NaOH Remaining |
|---|---|---|---|
| 0 | 0 | 58 | 33 |
| 10 | 0 | 59 | 59 |
| 0 | 15 | 45 | 26 |
| 10 | 15 | 59 | 47 |
| 0 | 30 | 42 | 18 |
| 10 | 30 | 54 | 40 |
| 0 | 60 | 37 | 13 |
| 10 | 60 | 51 | 34 |
| 0 | 90 | 38 | 11 |
| 10 | 90 | 48 | 28 |
| 0 | 120 | 31 | 9 |
| 10 | 120 | 43 | 27 |

The results were similar to those of Example 1 in that the residual GGM was higher when boric acid was added and the sodium hydroxide consumption was lower.

If desired, other borate compounds can be used as a complexing agent, preferably sodium borate which results from the neutralization of boric acid. In like manner, one can substitute potassium borate, borax, lithium borate and the like. The use of boron compounds avoids the air pollution problems created by the use of hydrogen sulfide or polysulfide.

What I claim is:

1. Galactoglucomannan-boric acid complex stable to alkaline hydrolysis.

\* \* \* \* \*